Figure 1:
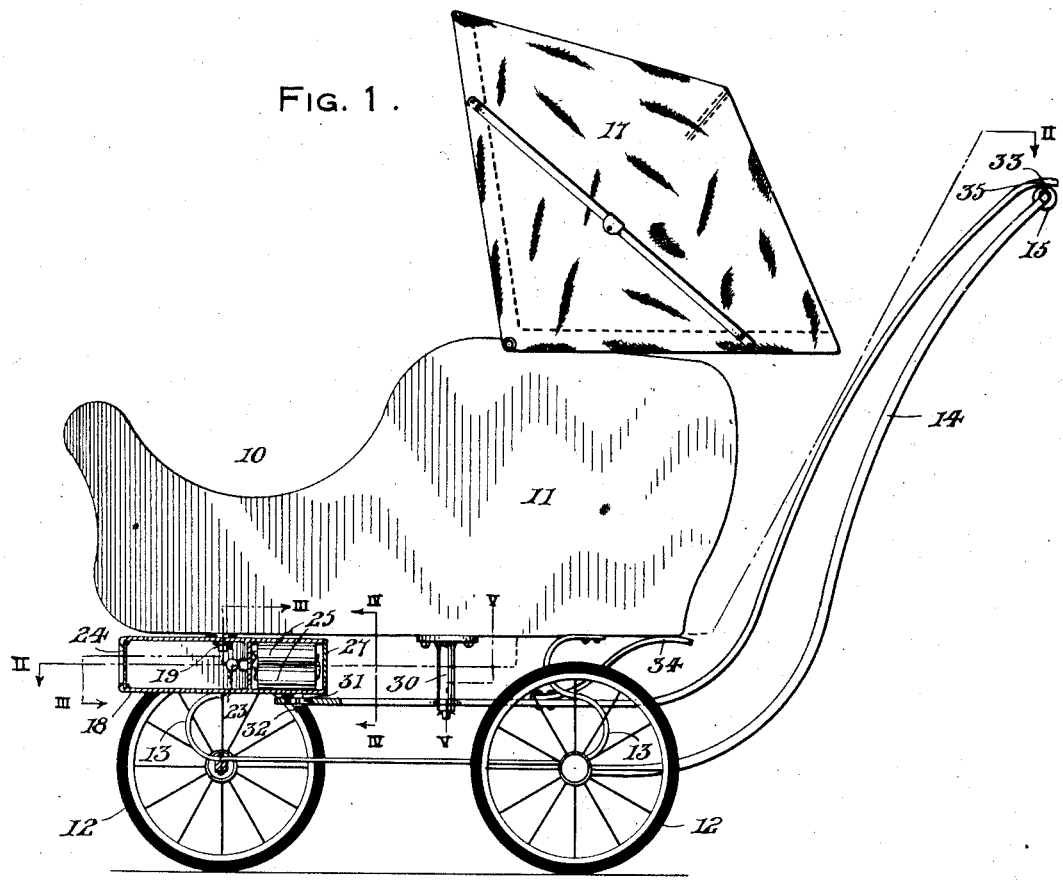

J. MODRZEJESKI.
BABY CARRIAGE.
APPLICATION FILED NOV. 20, 1919.

1,344,811.

Patented June 29, 1920.
2 SHEETS—SHEET 1.

Inventor
J. Modrzejeski

By

Attorney

J. MODRZEJESKI.
BABY CARRIAGE.
APPLICATION FILED NOV. 20, 1919.

1,344,811.

Patented June 29, 1920.
2 SHEETS—SHEET 2.

Inventor
J. Modrzejeski

By N. M. Wilson

Attorney

UNITED STATES PATENT OFFICE.

JOSEPH MODRZEJESKI, OF MILWAUKEE, WISCONSIN.

BABY-CARRIAGE.

1,344,811.  Specification of Letters Patent. Patented June 29, 1920.

Application filed November 20, 1919. Serial No. 339,391.

*To all whom it may concern:*

Be it known that I, JOSEPH MODRZEJESKI, a citizen of Poland, residing at Milwaukee, in the county of Milwaukee and State of Wisconsin, have invented certain new and useful Improvements in Baby-Carriages, of which the following is a specification.

The primary object of the invention is the provision of a dirigible headlight especially adapted for employment upon vehicles wherein the headlight is manually shifted in the direction of the intended path of travel of the vehicle.

A further object of the invention is to provide a headlight for baby carriages that is compact in arrangement and free from interference with the usual operation of the vehicle, the headlight being readily shiftable from a point adjacent the rear push bar of the carriage whereby the rays of light may be thrown in either lateral direction desired forwardly of the carriage.

With these general objects in view, the invention consists in the combination and arrangement of parts hereinafter fully described in connection with the accompanying drawings and in which like reference characters designate corresponding parts throughout the several views.

Figure 2:
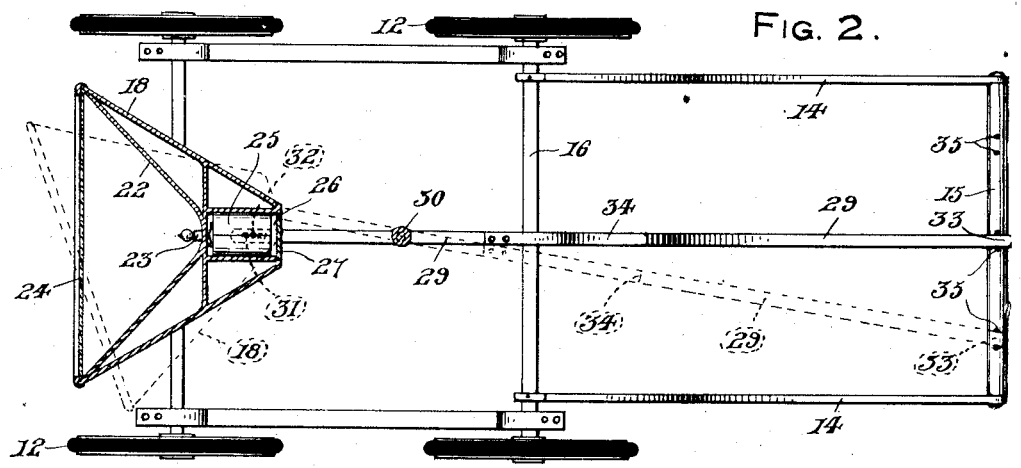
Figure 3:
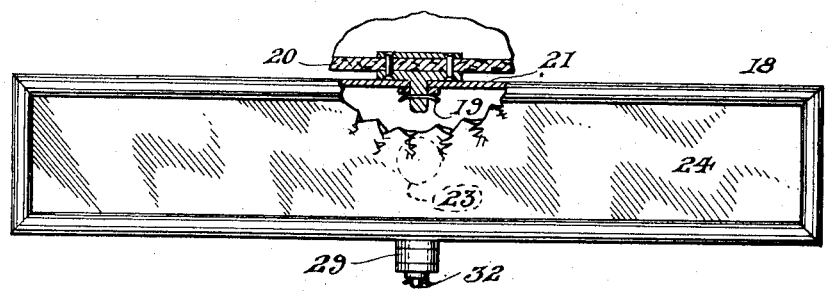
Figure 4:
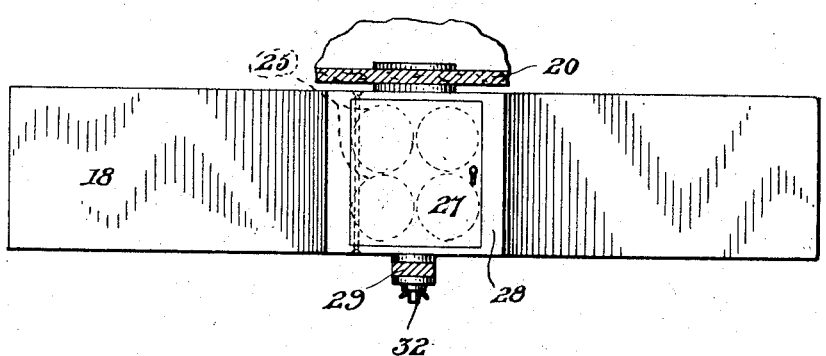
Figure 5:
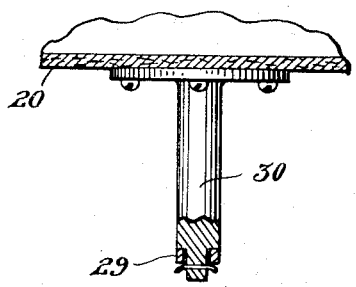
Figure 7:
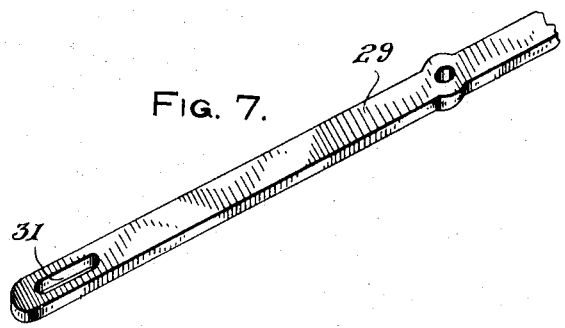
Figure 6:
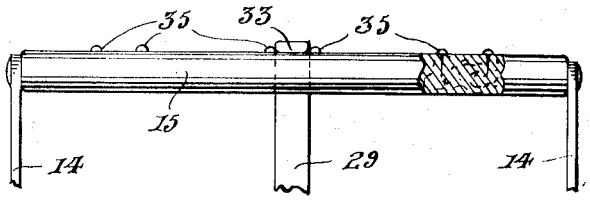

In the drawings,

Figure 1 is a side elevation of a baby carriage provided with the invention with parts broken away substantially upon a central vertical plane, Fig. 2 is a horizontal sectional view taken upon line II—II of Fig. 1 with the device illustrated by dotted lines in an adjusted position, Figs. 3, 4, and 5 are enlarged sectional views taken upon lines III—III; IV—IV; and V—V of Fig. 1 looking in the direction of the arrows, Fig. 6 is a rear elevation of the push bar of the vehicle partially broken away illustrating the retaining means for the lever when adjusted, and Fig. 7 is a perspective view of the forward slotted end portion of the shifting lever.

My invention being primarily designed for employment with perambulators, the usual form of baby carriage 10 is herein illustrated having a body 11 mounted upon wheels 12 by springs 13 while upwardly and rearwardly extending handles 14 having a cross or push bar 15 connecting the same are attached to the rear axle 16 of the vehicle for moving the same about. A foldable top 17 is illustrated upon the carriage body 11 and it will be understood that the operator walks behind the vehicle with his hands upon the bar 15 for causing the vehicle to travel in the desired direction.

A headlight having an inclosing casing 18 is pivoted forwardly beneath the body 11 by a swivel member 19 secured to the bottom 20 of the body 11 with the upper side 21 of the casing 18 suspended in journal relation thereon.

A suitable reflector 22 within the casing 18 accommodates a centrally positioned battery lamp or bulb 23 for throwing rays of light forwardly of the casing 18 through the glass or window 24 in the front side of the casing. Dry cell batteries 25 are provided for the lamp 23 positioned in a compartment 26 in the casing 18 rearwardly of the reflector 22 while a hinged door 27 in the rear contracted end 28 of the casing 18 permits access to the compartment 26 and the batteries 25 therein contained.

A curved lever 29 is pivoted to a depending post 30 carried by the carriage bottom 20, with the forward end of the lever 29 provided with a slot 31 having loose connection with a depending pin 32 upon the bottom of the casing 18. The upwardly extending rear end of the lever 29 has its free end portion 33 resiliently maintained slidably upon the upper face of the push bar 15, a leaf spring 34 carried by said lever normally engaging the body bottom 20 assisting the resiliency of the lever 29 in maintaining the end portion 33 thereof in engagement with the bar 15 between pairs of positioning lugs or contacts 35 upon said bar.

The complete operation of the invention will be fully understood from this detailed description thereof, the transverse shifting of the lever 29 upon the bar 15 serving to shift the headlight casing 18 for throwing the rays of light from the lamp 23 toward either side of the carriage 10. The shifting of the lever end 33 toward the left causes the headlight 18 to shift in a corresponding direction as illustrated by dotted lines in Fig. 2 of the drawings, the lugs 35 retaining the lever end 33 either adjusted laterally or centrally of the bar 15. The headlight 18 will remain in its adjusted position until the lever 28 is again manually shifted, the spring 34 sliding bodily along the carriage bottom 21 when the lever 29 is moved. While the form of the invention herein set forth is believed preferable, it will be understood that minor changes may be made therein without departing from the spirit and scope of the invention as claimed.

What is claimed as new is:—

1. In combination with a baby carriage including a push bar, a headlight pivoted beneath the body of the carriage and shifting means for the headlight projecting rearwardly thereof adapted for actuation at a point adjacent the push bar of the carriage.

2. A baby carriage having a body and a pushing member, a headlight swivelly suspended beneath the forward portion of the body, and a lever pivoted beneath the body operatively connected to the headlight with the rear end of the lever in adjustable engagement with said pushing member.

3. In combination with a baby carriage having a body and rearwardly positioned push bar, a headlight journaled for lateral shifting beneath the body, a depending post carried by the body rearwardly of the headlight, a curved lever pivoted to said post with its forward end operatively connected to the headlight and its rear end slidably positioned upon said bar.

4. In combination with a baby carriage having a body and rearwardly positioned push bar, a headlight journaled for lateral shifting beneath the body, a depending post carried by the body rearwardly of the headlight, a curved lever pivoted to said post with its forward end operatively connected to the headlight and its rear end slidably positioned upon said bar, a spring carried by the lever normally engaging the bottom of the carriage adapted for resiliently maintaining the rear free end portion of the lever in contact with said bar and pairs of retaining lugs for the lever adapted for the reception of the free end portion of the lever when the headlight is in its adjusted positions.

5. In combination with a baby carriage having a body mounted upon wheels and rearwardly extending handles with a cross bar connecting the upper ends of the handles, a casing swiveled beneath the body adjacent the forward end thereof, a battery lamp within the casing, a post depending from the carriage body, a lever pivoted to said post operatively connected beneath the casing whereby the pivotal shifting of the lever is adapted for laterally shifting the casing, the said lever having a rear portion slidable upon said bar adapted for actuation by the operator of the carriage.

6. In combination with a baby carriage having a body mounted upon wheels and rearwardly extending handles with a cross bar connecting the upper ends of the handles, a casing swiveled beneath the body adjacent the forward end thereof, a battery lamp within the casing, a post depending from the carriage body, a lever pivoted to said post operatively connected beneath the casing whereby the pivotal shifting of the lever is adapted for laterally shifting the casing, the said lever having a rear portion slidable upon said bar adapted for actuation by the operator of the carriage, a leaf spring upon the lever slidably engaging the bottom of the carriage, pairs of retaining lugs upon the bar adapted for the seating reception of the adjacent end portion of the lever therebetween whereby the lever and casing are adapted for retention in their adjusted positions.

In testimony whereof I affix my signature.

JOSEPH MODRZEJESKI.